United States Patent
Waylett et al.

(10) Patent No.: US 11,056,897 B2
(45) Date of Patent: Jul. 6, 2021

(54) RECHARGEABLE BATTERY SYSTEM

(71) Applicants: Tyler Rhys Waylett, Haslett, TX (US); Jay A. Fuhr, Hummlestown, PA (US)

(72) Inventors: Tyler Rhys Waylett, Haslett, TX (US); Jay A. Fuhr, Hummlestown, PA (US)

(73) Assignees: Tyler Rhys Waylett, Haslett, TX (US); J A Fuhr Family Trust, Hummlestown, PA (US)

( * ) Notice: Subject to any disclaimer, the term of this patent is extended or adjusted under 35 U.S.C. 154(b) by 0 days.

(21) Appl. No.: 16/159,017

(22) Filed: Oct. 12, 2018

(65) Prior Publication Data

US 2019/0044354 A1 Feb. 7, 2019

Related U.S. Application Data

(63) Continuation-in-part of application No. 14/958,107, filed on Dec. 3, 2015, now Pat. No. 10,103,557.

(60) Provisional application No. 62/086,931, filed on Dec. 3, 2014.

(51) Int. Cl.
*H02J 7/00* (2006.01)
*H02J 7/34* (2006.01)

(52) U.S. Cl.
CPC .......... *H02J 7/0044* (2013.01); *H02J 7/0047* (2013.01); *H02J 7/0069* (2020.01); *H02J 7/342* (2020.01); *H02J 7/00* (2013.01); *H02J 7/0049* (2020.01)

(58) Field of Classification Search
CPC .............................. H02J 7/0054; H02J 7/0047

USPC .......................................................... 320/115
See application file for complete search history.

(56) References Cited

U.S. PATENT DOCUMENTS

| | | | | |
|---|---|---|---|---|
| 7,010,311 | B2* | 3/2006 | Liu | H04M 1/725 455/426.1 |
| 8,390,255 | B1* | 3/2013 | Fathollahi | H02J 7/0045 206/308.3 |
| 9,859,725 | B2* | 1/2018 | Nowak | H02J 7/0036 |
| 9,946,317 | B2* | 4/2018 | Backman | G06F 1/266 |
| 2008/0166968 | A1* | 7/2008 | Tang | H04W 99/00 455/41.2 |
| 2008/0167088 | A1* | 7/2008 | Rabu | G06F 1/1632 455/573 |
| 2013/0300343 | A1* | 11/2013 | Files | H02J 7/0055 320/103 |
| 2014/0195826 | A1* | 7/2014 | Wojcik | H05K 5/0086 713/300 |
| 2015/0123620 | A1* | 5/2015 | Nowak | H02J 7/0054 320/137 |

(Continued)

*Primary Examiner* — Suchin Parihar
(74) *Attorney, Agent, or Firm* — Novian & Novian LLP; Michael O'Brien

(57) ABSTRACT

A combination handheld mobile device and rechargeable battery system includes the handheld mobile device having a body and being portable; and the rechargeable battery system operably associated with and to provide electrical energy to the handheld mobile device, the rechargeable battery system having a battery having a body with a partial hollow cavity; a power port conductively coupled to the battery and carried within the partial hollow cavity; and a terminal conductively coupled to the battery and carried on an outside surface of the body; and the power port is to receive a power cord to recharge the battery via an internal charger associated with the power port; and the terminal is to engage with a docking station to recharge the battery.

24 Claims, 3 Drawing Sheets

(56) References Cited

U.S. PATENT DOCUMENTS

| | | | |
|---|---|---|---|
| 2015/0194833 A1* | 7/2015 | Fathollahi | H02J 7/0044 320/114 |
| 2015/0349572 A1* | 12/2015 | McCoy | H02J 50/10 320/103 |
| 2017/0047753 A1* | 2/2017 | Precheur | H02J 7/007 |
| 2017/0060207 A1* | 3/2017 | Backman | G06F 1/266 |

* cited by examiner

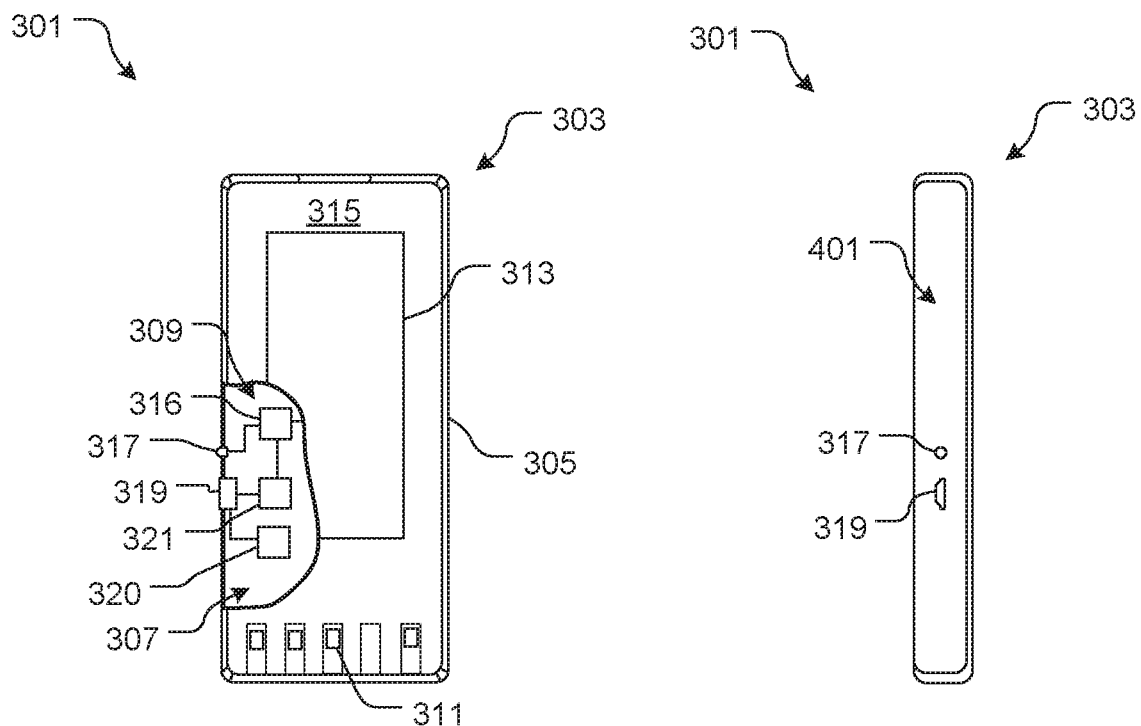
FIG. 3
FIG. 4
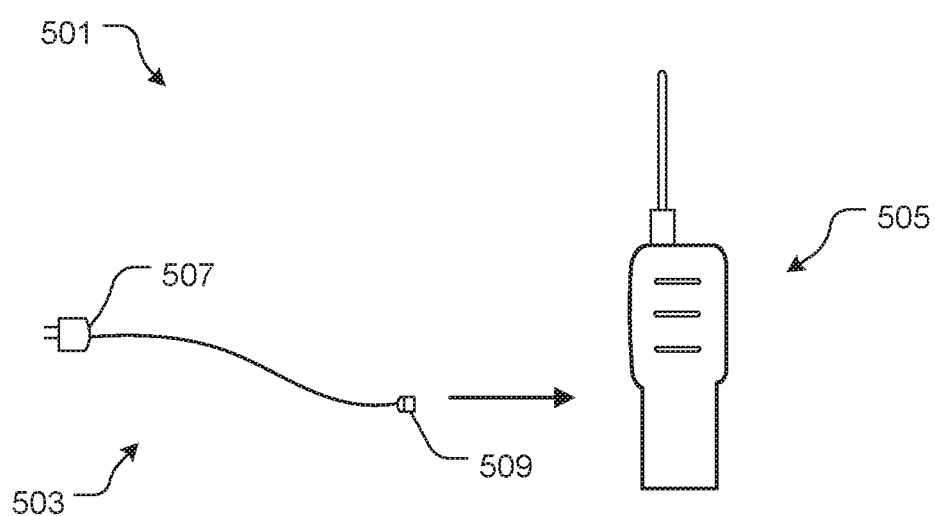
FIG. 5

RECHARGEABLE BATTERY SYSTEM

BACKGROUND

1. Field of the Invention

The present invention relates generally to rechargeable batteries, and more specifically, to handheld radios with rechargeable batteries.

2. Description of Related Art

Handheld radios are well known in the art and are effective means to provide wireless communication. For example, FIG. 1 depicts a simplified communication system 101 having two handheld radios 103, 105 remote from each other and configured to provide communication means between to two or more persons distanced apart from each other. A common disadvantage with radios 103, 105 is the limited duration of use due to the large energy output required to communicate wirelessly. As shown in FIG. 2, a charging station 201 is configured to receive and simultaneously recharge the batteries (not shown) operably associated with radio 103.

A problem associated with charger station 201 is the limited use. For example, the radio 103 is inoperable while attached to station 201, thereby requiring the user to wait until the batteries are charged before reuse. Further, the station 201 is not configured to be portable with the radio 103, for example, the user will typically place station 201 in a location and return the radio 103 to the station 201 during the recharging process.

Although great strides have been made in the area of handheld radios, many shortcomings remain.

DESCRIPTION OF THE DRAWINGS

The novel features believed characteristic of the embodiments of the present application are set forth in the appended claims. However, the embodiments themselves, as well as a preferred mode of use, and further objectives and advantages thereof, will best be understood by reference to the following detailed description when read in conjunction with the accompanying drawings, wherein:

FIG. 3 is a back view of a recharging system for a handheld radio in accordance with a preferred embodiment of the present application;

FIG. 4 is a side view of the system of FIG. 3;

FIG. 5 is a simplified front view of a power cord operably associated with the handheld radio using the recharging system of FIG. 3;

Figure 1:
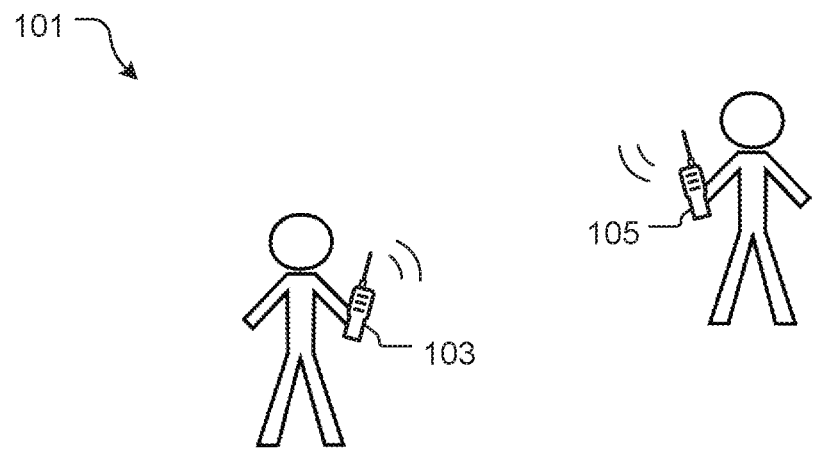
FIG. 1 is a simplified front view of a conventional communication system.
Figure 2:
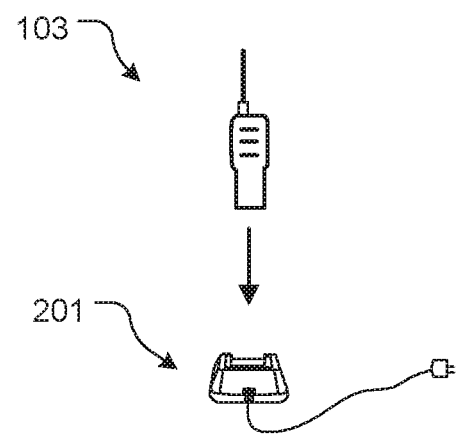
FIG. 2 is a simplified front view of a conventional recharging station for the handheld radio of the communication system of FIG. 1.

While the system and method of use of the present application is susceptible to various modifications and alternative forms, specific embodiments thereof have been shown by way of example in the drawings and are herein described in detail. It should be understood, however, that the description herein of specific embodiments is not intended to limit the invention to the particular embodiment disclosed, but on the contrary, the intention is to cover all modifications, equivalents, and alternatives falling within the spirit and scope of the present application as defined by the appended claims.

DETAILED DESCRIPTION OF THE PREFERRED EMBODIMENT

Illustrative embodiments of the system and method of use of the present application are provided below. It will of course be appreciated that in the development of any actual embodiment, numerous implementation-specific decisions will be made to achieve the developer's specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

The system and method of use in accordance with the present application overcomes one or more of the above-discussed problems commonly associated with conventional handheld radios. Specifically, the system of the present application is configured to provide rapid and effective means to recharge the batteries via a docketing station or via a port conductively coupled to an external electrical power source. These and other unique features of the system and method of use are discussed below and illustrated in the accompanying drawings.

The system and method of use will be understood, both as to its structure and operation, from the accompanying drawings, taken in conjunction with the accompanying description. Several embodiments of the system are presented herein. It should be understood that various components, parts, and features of the different embodiments may be combined together and/or interchanged with one another, all of which are within the scope of the present application, even though not all variations and particular embodiments are shown in the drawings. It should also be understood that the mixing and matching of features, elements, and/or functions between various embodiments is expressly contemplated herein so that one of ordinary skill in the art would appreciate from this disclosure that the features, elements, and/or functions of one embodiment may be incorporated into another embodiment as appropriate, unless described otherwise.

Referring now to the drawings wherein like reference characters identify corresponding or similar elements throughout the several views, FIG. 3 depicts a back view of a rechargeable power system 301 in accordance with a preferred embodiment of the present application. It will be appreciated that the system 301 overcomes one or more of the above-listed problems commonly associated with the conventional battery systems operably associated with handheld radios.

In the contemplated embodiment, system 301 includes one or more of a rechargeable battery 303 configured to securely engage with and power a handheld radio, e.g., radio 505 and/or 603. Battery 303 includes a body 305 forming a cavity 307 that houses the various components of the battery and a control system 309. A plurality of terminals 311 are used to provide means to recharge battery 303 via a docketing station 201. Thus, in the contemplated embodiment, two separate recharging means could be used to recharge battery 303, for example, station 201 via terminals 311 and a power cord 503 via a port 319, as will be discussed below.

In one preferred embodiment, a surface treatment 313 is secured to surface 315 of body 305 to increase frictional gripping between battery 303 and the fingers of the user. The surface treatment 313 could be grooves, etches, and/or material placed on surface 315 such as an elastomeric material. In addition, it should be appreciated that the surface treatment could create grip with other objects, such as a surface, a bag, or the like, and not merely with the user's hand. In the exemplary embodiment, the surface treatment 313 is shown in a selected, confined location; however, it will be appreciate that treatment 313 could be positioned on any surface and/or the entire surface area of the battery 303. It is further contemplated that the surface treatment could be configured to increase the conductivity of heat between the body and another surface or open to the surrounding environment.

Control system 309 is configured to control the electrical energy being channeled to the battery 303 via port 319. In the preferred embodiment, system 309 includes one or more of a processor 316 conductive coupled to a light 317 configured to notify the user when the battery is fully charged, e.g., turning from a red illumination to a green illumination as the battery becomes fully charged. In some embodiments, the light 317 could further be configured to provide the user with notice of one or more of a charge level of the battery; a state of health of the battery; an over-heat condition of the battery; and a remaining battery cycle life.

System 309 further includes a transformer 321 and/or other similarly suitable devices configured to convert the correct voltage and amperage to the battery 303 from the external power source (not shown). It should be appreciated that the transformer could include one or more of a linear regulator, switching regulatory, and power management integrated circuit device. System 309 can further include an inductive power receiving antenna 320 conductively coupled to the power port 319 and to the battery, the inductive power receiving antenna being carried within the partial hollow cavity of the body.

As shown in FIG. 4, the port 319 is positioned on a side surface 401 of body 305; however, it is also contemplated positioning the port on any surface of body 305 in alternative embodiments.

In FIG. 5, a system 501 is shown with a handheld device 505 configured to utilize the features of system 301. It will be appreciated that system 505 is recharged via a cable 503 having an AC plug 507 at one end and a USB plug 509 at the opposing end. Thus, port 319 is configured to receive a USB plug in the contemplated embodiment; however, it will be appreciated that port 319 could be configured to receive power cord receptacles having different shapes and sizes than a USB plug. In some embodiments, the port can easily be adapted for use with one or more power connectors, including but not limited to USB type connector, ethernet connector, USB type-c connector, lightning connector to inductively couple power receiving device conductively to a power source or alternating current (AC) or direct current (DC) to couple to the battery and Anderson type connector to receive direct current power produced by solar cell sources.

Figure 6:
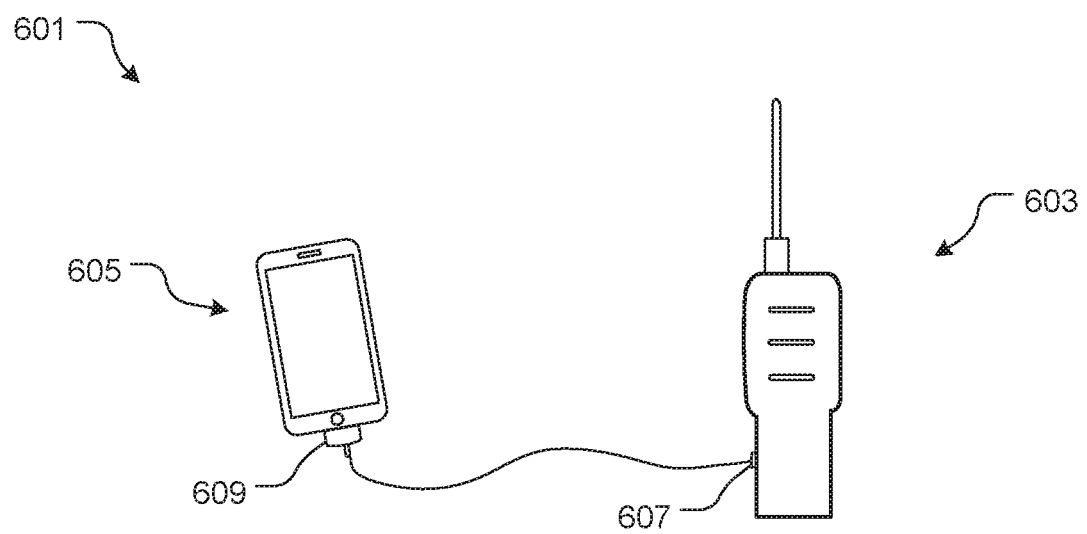
FIG. 6 is a simplified front view of an external device operably associated with the handheld radio using the recharging system of FIG. 3.

Referring now to FIG. 6 in the drawings, an alternative embodiment is shown. In this embodiment, system 601 incorporates one or more of the system features discussed above; however, system 601 is configured with the option of providing electrical energy from the rechargeable battery of handheld radio 603 to an external battery operably associated with a mobile device 605. This feature is achieved via a cable having plugs 607, 609 on opposing ends and configured to secure to receptacles associated with handheld radio 603 and mobile device 605. Thus, in the contemplated embodiment, the handheld radio 603 is configured to recharge the batteries of another mobile device via the rechargeable batteries.

One of the unique features believed characteristic of the present application is the ability to recharge the rechargeable batteries of a handheld radio with a USB power cord, which in turn channels the electrical power from an AC power source, e.g., a wall socket. This feature allows the recharging of the handheld radio at remote location away from the charging station. Thus, the user can now charge from both a recharging station and an AC power supply via the USB cord. It is also contemplated using DC power, e.g., from a car battery, to recharge the handheld radio. The system discussed above facilitates these features. It should be appreciated that the mobile device and battery combination could be incorporated into various tools/handheld devices, including but not limited to a power tool battery, a scanner battery, a power scouter battery, drone, e-bike battery type, and a portable lantern batteries.

Figure 7:
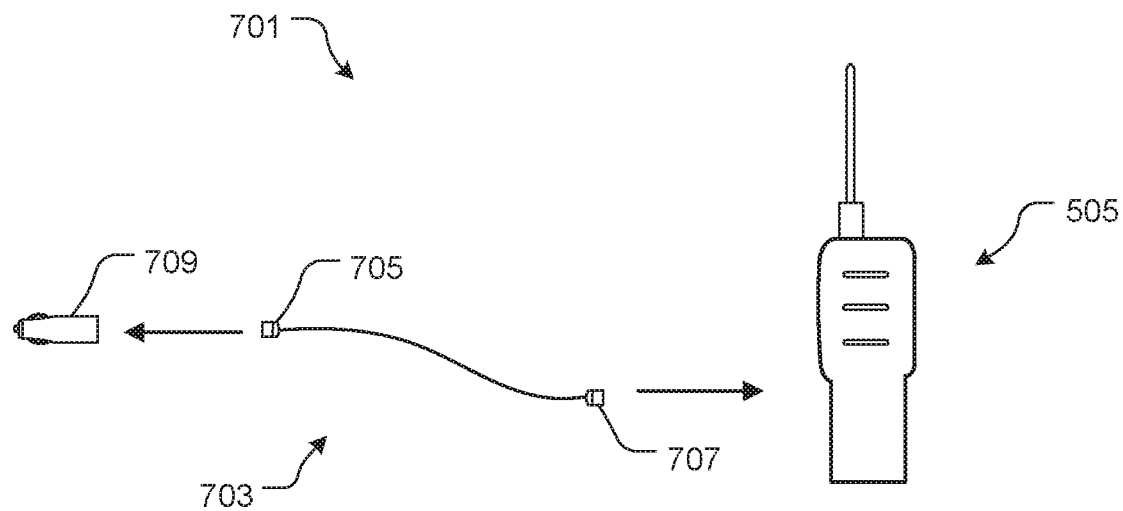
FIG. 7 is a simplified front view of a power cord operably associated with the handheld radio using the recharging system of FIG. 3.

In FIG. 7, a system 701 is shown with a handheld device 505 configured to utilize the features of system 301. It will be appreciated that system 701 is recharged via a cable 703 having a USB plug 705 at one end and a micro USB plug 707 at the opposing end. Thus, port 319 of handheld device 505 is configured to receive the micro USB plug 707, while the USB plug 705 is configured to connect with a car adapter 709. Thus, in the contemplated embodiment, the device 505 is configured to recharge via the car battery.

Another unique feature is the ability to use the handheld device despite having depleted batteries. This feature is achieved by powering the components of the handheld radio directly from an AC or DC power supply via a power cord operably associated with port 319.

Another unique feature is the surface texturing of the body, which in turn creates a gripping surface for better friction. These and other unique features are contemplated in the embodiments discussed above.

The particular embodiments disclosed above are illustrative only, as the embodiments may be modified and practiced in different but equivalent manners apparent to those skilled in the art having the benefit of the teachings herein. It is therefore evident that the particular embodiments disclosed above may be altered or modified, and all such variations are considered within the scope and spirit of the application. Accordingly, the protection sought herein is as set forth in the description. Although the present embodiments are shown above, they are not limited to just these embodiments, but are amenable to various changes and modifications without departing from the spirit thereof.

What is claimed is:

1. A combination handheld mobile radio device and rechargeable battery system, comprising:
   the handheld mobile radio device having a body and being portable, the handheld mobile radio having a terminal at a lower surface and configured to removably engage with a charging port; and
   the rechargeable battery system operably associated with and configured to provide electrical operating energy to the handheld mobile radio device, which is the primary source of operating power for the handheld mobile radio device and configured to provide electrical energy to an external battery, the rechargeable battery system having:

one or more electrochemical battery cell;
a body with a partial hollow cavity;
a power port conductively coupled to the battery and carried within the partial hollow cavity, the power port is configured to engage with an external cord conductively coupled to an external power source for recharging the battery, the power port is configured to engage with the external cord for charging the external battery, the power port extends outside the body of the battery so that the power port engages with the external cord for charging the external battery; and
a transformer conductively coupled to the power port and to the battery, the transformer being carried within the partial hollow cavity of the body, the transformer comprises one of:
a linear regulator;
a switching regulator; and
a power management integrated circuit device;
wherein the terminal is conductively coupled to the battery and carried on an outside surface of the body;
wherein the terminal is configured to engage with a docking station to recharge the battery; and
wherein both the docking station and the external power source provide electrical power to the battery during charging.

2. The combination of claim 1, further comprising:
a surface treatment on one or more surfaces of the body of the mobile radio device and configured to increase frictional gripping associated with the body.

3. The combination of claim 1, further comprising:
a signal light associated with the battery and configured to signal a battery condition.

4. The combination of claim 3, wherein the battery condition is one of:
a charge level of the battery;
a state of health of the battery;
an over-heat condition of the battery; and
a remaining battery cycle life.

5. The combination of claim 4, further comprising:
an inductive power receiving antenna conductively coupled to the power port and to the battery, the inductive power receiving antenna being carried within the partial hollow cavity of the body.

6. The combination of claim 1, further comprising:
a microprocessor conductively coupled to the power port and to the battery, the microprocessor being carried within the partial hollow cavity of the body.

7. The combination of claim 1, wherein the power port is one or more of:
a USB port;
an ethernet port;
an Anderson pole connector;
a USB type-c connector; and
a lightning connector.

8. The combination of claim 1, further comprising:
an external cable having a first plug and a second plug;
wherein the first plug is configured to engage with the power port of the rechargeable battery system;
wherein the second plug is configured to engage with a receptacle of the mobile radio device; and
wherein the external cable is configured to direct power from the rechargeable battery system to the mobile radio device to charge an internal battery of them mobile radio device via the rechargeable battery system.

9. The combination of claim 1, further comprising:
a surface treatment on one or more surfaces of the body, the surface treatment being configured to increase conductivity of heat between the body and another surface or open to surrounding environment.

10. A method to recharge a handheld mobile radio device, comprising:
providing the combination of claim 1;
recharging the battery via the power port with the power cord; and
recharging the battery via the terminal with the docking station.

11. The method of claim 10, wherein the battery is configured to be used with one of a power tool, a scanner, a power scouter, a drone, and an e-bike.

12. The method of claim 10, further comprising:
providing electrical energy to an external power source via the power port.

13. The method of claim 10, further comprising:
providing electrical energy to the device via the terminal used with the docking station while selectively limiting the recharging of the battery via the power port with the power cord.

14. The combination of claim 6, further comprising a means of measuring temperature internally carried within the partial hollow cavity of the body and the conductively coupled to one or more processors.

15. The combination of claim 1, further comprising, having one or more electrochemical battery cells.

16. The combination of claim 1, further comprising, having one or more Super Capacitors.

17. The combination of claim 1, further comprising, having one or more fuel cells, ULTRABATTERY cells and one or more Super capacitors.

18. The combination of claim 3, further comprising, having one or more Light Emitting Diodes.

19. The combination of claim 3, further comprising, having one or more Liquid Crystal Displays.

20. The combination of claim 6, having one or more Microchip Technology Inc., PIC microprocessors.

21. The combination of claim 6, having one or more CYPRESS PSoC microprocessors including the PSoC 4.

22. The combination of claim 6, having one or more Microchip Technology Inc., Programmable Power Delivery Controllers including the UPD1001.

23. The combination of claim 6, having one or more USB Type C port controllers.

24. The combination of claim 6, having one or more Application Specific Integrated Circuit ("ASIC") microprocessors to provide one or more system functions including but not limited to battery cell changing, battery pack temperature measurement, and LCD display control.

* * * * *